United States Patent
Hughes

Patent Number: 6,128,974
Date of Patent: Oct. 10, 2000

[54] START GEAR ENGAGEMENT CONTROL FOR CONTROLLER-ASSISTED, MANUALLY SHIFTED, SYNCHRONIZED, COMPOUND TRANSMISSION WITH SPLITTER SECTION

[75] Inventor: Douglas A. Hughes, Wixom, Mich.

[73] Assignee: Eaton Corporation, Cleveland, Ohio

[21] Appl. No.: 09/389,580

[22] Filed: Sep. 3, 1999

[51] Int. Cl.[7] .............................. F16H 59/40; F16H 59/56
[52] U.S. Cl. .......................... 74/745; 74/336 R; 192/3.63
[58] Field of Search ................................ 74/745, 336 R, 74/335; 192/3.63

[56] References Cited

U.S. PATENT DOCUMENTS

| | | | |
|---|---|---|---|
| 4,361,060 | 11/1982 | Smyth | 477/78 |
| 4,527,447 | 7/1985 | Richards | 74/336 R |
| 4,754,665 | 7/1988 | Vandervoort | 74/745 |
| 4,788,889 | 12/1988 | Davis et al. | 74/745 |
| 4,850,236 | 7/1989 | Braun | 74/337 |
| 4,974,468 | 12/1990 | Reynolds | 74/477 |
| 4,989,706 | 2/1991 | Morscheck | 192/53 |
| 5,390,561 | 2/1995 | Stine | 74/331 |
| 5,408,895 | 4/1995 | Chan et al. | 74/336 R X |
| 5,416,698 | 5/1995 | Hutchison | 74/336 R X |
| 5,435,212 | 7/1995 | Menig | 74/745 |
| 5,506,771 | 4/1996 | Chan et al. | 74/336 R X |
| 5,582,558 | 12/1996 | Palmeri | 477/109 |
| 5,651,292 | 7/1997 | Genise | 74/745 |
| 5,661,998 | 9/1997 | Genise | 74/335 |
| 5,735,771 | 4/1998 | Genise | 477/111 |
| 5,737,969 | 4/1998 | Braun et al. | 74/477 |
| 5,738,195 | 4/1998 | Gluys et al. | 192/53.31 |
| 5,738,196 | 4/1998 | Gluys et al. | 192/53.331 |
| 5,743,143 | 4/1998 | Carpenter | 74/336 R |
| 5,761,628 | 6/1998 | Steeby et al. | 74/336 R X |
| 5,904,068 | 5/1999 | Genise | 74/335 |
| 6,044,721 | 4/2000 | Genise | 74/335 |

*Primary Examiner*—Charles A Marmor
*Assistant Examiner*—Ankur Parekh
*Attorney, Agent, or Firm*—Howard D. Gordon

[57] ABSTRACT

A control for enhanced manual start ratio engagement in a computer-assisted (48) vehicular compound transmission (16) having a synchronized main section (16A) shifted by a manually operated shift lever (31), an auxiliary splitter section, and a controller (48). The splitter section (16E) is located behind the main section and is provided with a three-position (L, H, N) actuator (46) and is commanded to a splitter-neutral position upon sensing that the vehicle is essentially stopped (OS<REF), that the master clutch (14) is disengaged and the main section is in neutral.

5 Claims, 4 Drawing Sheets

START GEAR ENGAGEMENT CONTROL FOR CONTROLLER-ASSISTED, MANUALLY SHIFTED, SYNCHRONIZED, COMPOUND TRANSMISSION WITH SPLITTER SECTION

RELATED APPLICATIONS

This application is related to the following co-pending applications assigned to EATON CORPORATION, assignee of this application:

Ser. No. 09/148,873 filed Sep. 8, 1998 and titled CONTROL FOR CONTROLLER-ASSISTED, MANUALLY SHIFTED, SPLITTER-TYPE COMPOUND TRANSMISSIONS, now U.S. Pat. No. 6,044,721

Ser. No. 09/148,882 filed Sep. 8, 1998 and titled CONTROL FOR CONTROLLER-ASSISTED, MANUALLY SHIFTED, SYNCHRONIZED, SPLITTER-TYPE COMPOUND TRANSMISSIONS Ser. No. 09/294,118 filed Apr. 19, 1999 and titled ASSISTED, LEVER-SHIFTED MECHANICAL TRANSMISSION SYSTEM, now abandoned Ser. No. 09/346,381 filed Jul. 1, 1999 and titled CONTROL FOR CONTROLLER-ASSISTED, MANUALLY SHIFTED, SYNCHRONIZED, SPLITTER-TYPE COMPOUND TRANSMISSIONS

BACKGROUND OF THE INVENTION

1. Field of the Invention

The present invention relates to a controller-assisted, manually shifted, synchronized vehicular transmission system including a splitter-type compound transmission. The system will sense a start-from-stop intent to shift the main section, from main section neutral into a start ratio (such as 1st–5th in an 18-speed transmission), and will automatically shift the splitter section into neutral, allowing the synchronized main section to be easily engaged into a target ratio with relatively low synchronizer force and, thus, relatively low driver effort. Upon sensing completion of the main section shift into a main section target start ratio, or upon sensing reengagement of the master clutch, the splitter section will be caused to engage in an appropriate splitter ratio. More particularly, at stop conditions, the splitter is automatically shifted to and retained in neutral only if both the master clutch and the main transmission section are disengaged.

2. Description of the Prior Art

Compound manually shifted mechanical transmissions of the range, splitter and/or combined range/splitter type are in wide use in heavy-duty vehicles and are well known in the prior art, as may be seen by reference to U.S. Pat. Nos. 4,754,665; 5,272,929; 5,370,013 and 5,390,561, 5,546,823; 5,609,062 and 5,642,643, the disclosures of which are incorporated herein by reference. Typically, such transmissions include a main section shifted directly or remotely by a manual shift lever and one or more auxiliary sections connected in series therewith. The auxiliary sections most often were shifted by a slave actuator, usually pneumatically, hydraulically, mechanically and/or electrically operated, in response to manual operation of one or more master switches. Shift controls for such systems may be seen by reference to U.S. Pat. Nos. 4,455,883; 4,550,627; 4,899,607; 4,920,815; 4,974,468; 5,000,060; 5,272,931; 5,281,902; 5,222,404; 5,350,561 and 5,737,696, the disclosures of which are incorporated herein by reference.

Three-position splitter actuators and transmission systems utilizing same are disclosed in U.S. Pat. Nos. 5,651,292 and 5,661,998, the disclosures of which are incorporated herein by reference.

Fully or partially automated transmission systems wherein a microprocessor-based electronic control unit (ECU) receives input signals indicative of various system operating conditions and processes same according to logic rules to issue command output signals to one or more system actuators are known in the prior art, as may be seen by reference to U.S. Pat. Nos. 4,361,060; 4,593,580; 4,595,986; 4,850,236; 5,435,212; 5,582,069; 5,582,558; 5,620,392; 5,651,292; 5,679,096; 5,682,790 and 5,735,771; the disclosures of which are incorporated herein by reference.

Synchronized transmissions and/or transmission sections and synchronized jaw clutch assemblies therefor are known in the prior art, as may be seen by reference to U.S. Pat. Nos. 4,989,706; 5,738,195 and 5,738,196, the disclosures of which are incorporated herein by reference.

U.S. Pat. No. 4,527,446, the disclosure of which is incorporated herein by reference, discloses a fully automated, blocked-type transmission wherein the main section is automatically shifted to main section neutral during each shift.

Prior art synchronized transmissions for medium- and heavy-duty vehicles were not totally satisfactory, as excessive force was required to operate the synchonizers when engaging a start ratio.

SUMMARY OF THE INVENTION

A preferred embodiment of the present invention involves a computer-assisted mechanical compound transmission system wherein the synchronized main section is shifted by a manually controlled shift lever and the engine is fueled and the auxiliary sections are shifted by actuators at least partially controlled by an ECU to enhance shifting. The ECU uses sensed and/or calculated inputs indicative of system operating parameters, such as operation of a splitter switch and/or a range switch, position and/or rate of change of position of the shift lever, engaged gear ratio, engine speed, output shaft speed, clutch condition and/or throttle pedal position, to determine a target gear ratio and assist shifting by controlling the three-position splitter actuator shift actuator, engine fueling and/or operation of the range shift actuator.

In accordance with the present invention, the drawbacks of the prior art are minimized or overcome by the provision of a control method/system that includes logic rules or an algorithm using inputs to determine when a manual shift into a start-from-stop ratio from main transmission section neutral is intended and to automatically cause the splitter section to be shifted into splitter section neutral. This will allow the main transmission section to be easily shifted into the start ratio. With the main section in neutral, retaining the splitter in neutral will reduce the inertia of the rotating elements being controlled by the main section synchronizer friction members, allowing the main section to be engaged in the target start ratio with a significantly reduced torque. To assure that the operator is intending a shift into a start ratio from a transmission neutral condition, and to minimize the possibility of a false main section neutral signal causing an unintended shift into driveline neutral by automatically shifting the splitter section into neutral, if vehicle speed is very low (less than 2 or 3 MPH), an automatic shift into splitter section neutral will not be commanded unless lever (main section) neutral and master clutch disengagement are sensed.

Accordingly, it is an object of the present invention to provide ECU assistance for enhanced start ratio engagement of a synchronized mechanical compound transmission having a synchronized main section shifted by a manually operated shift lever and an auxiliary splitter section.

This and other objects and advantages of the present invention will become apparent from a reading of the following description of the preferred embodiment taken in connection with the attached drawings.

DESCRIPTION OF THE PREFERRED EMBODIMENT

Figure 1:
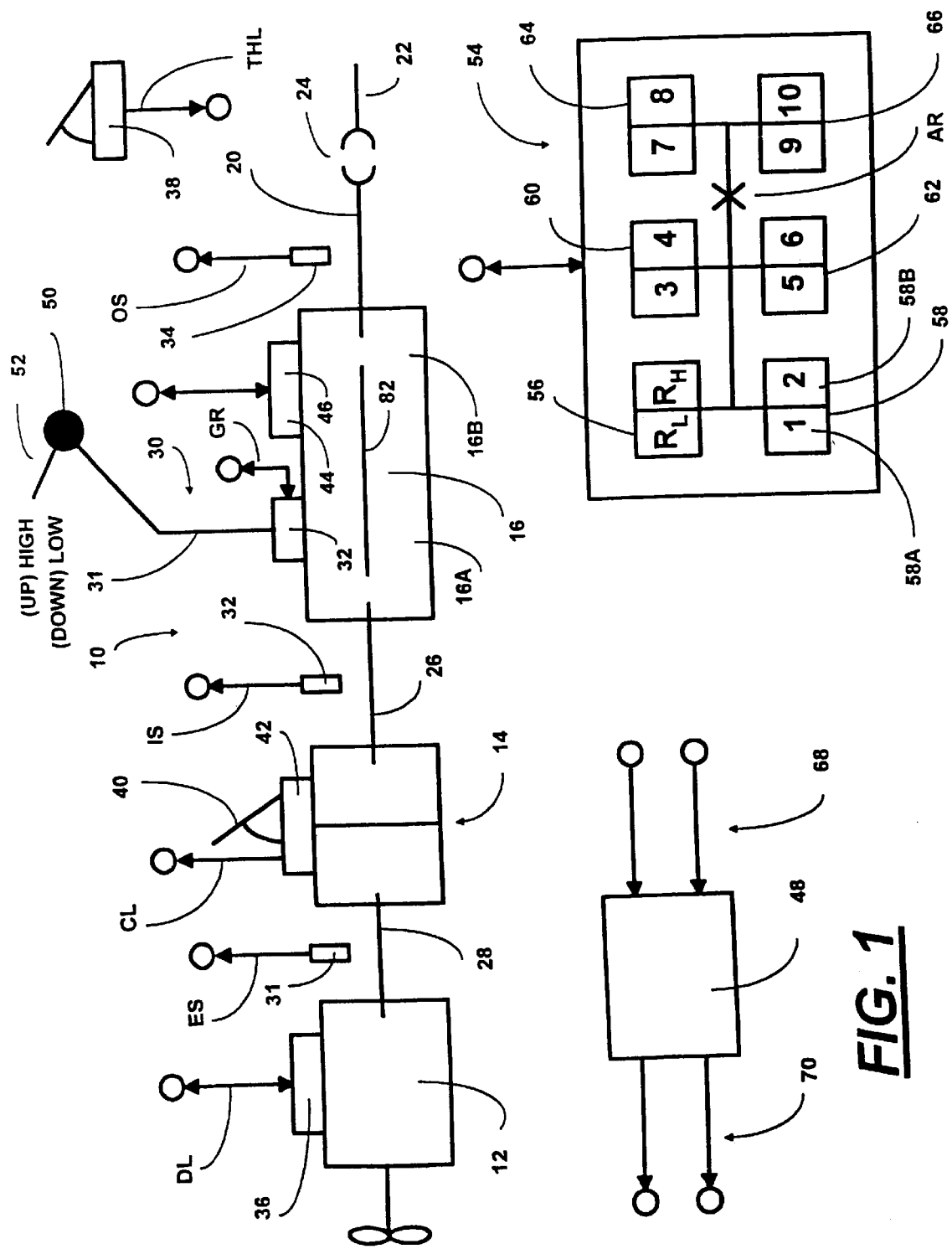
FIG. 1 is a schematic illustration of an ECU-assisted, synchronized compound splitter-type mechanical transmission system advantageously utilizing the control techniques of the present invention.
Figure 2:
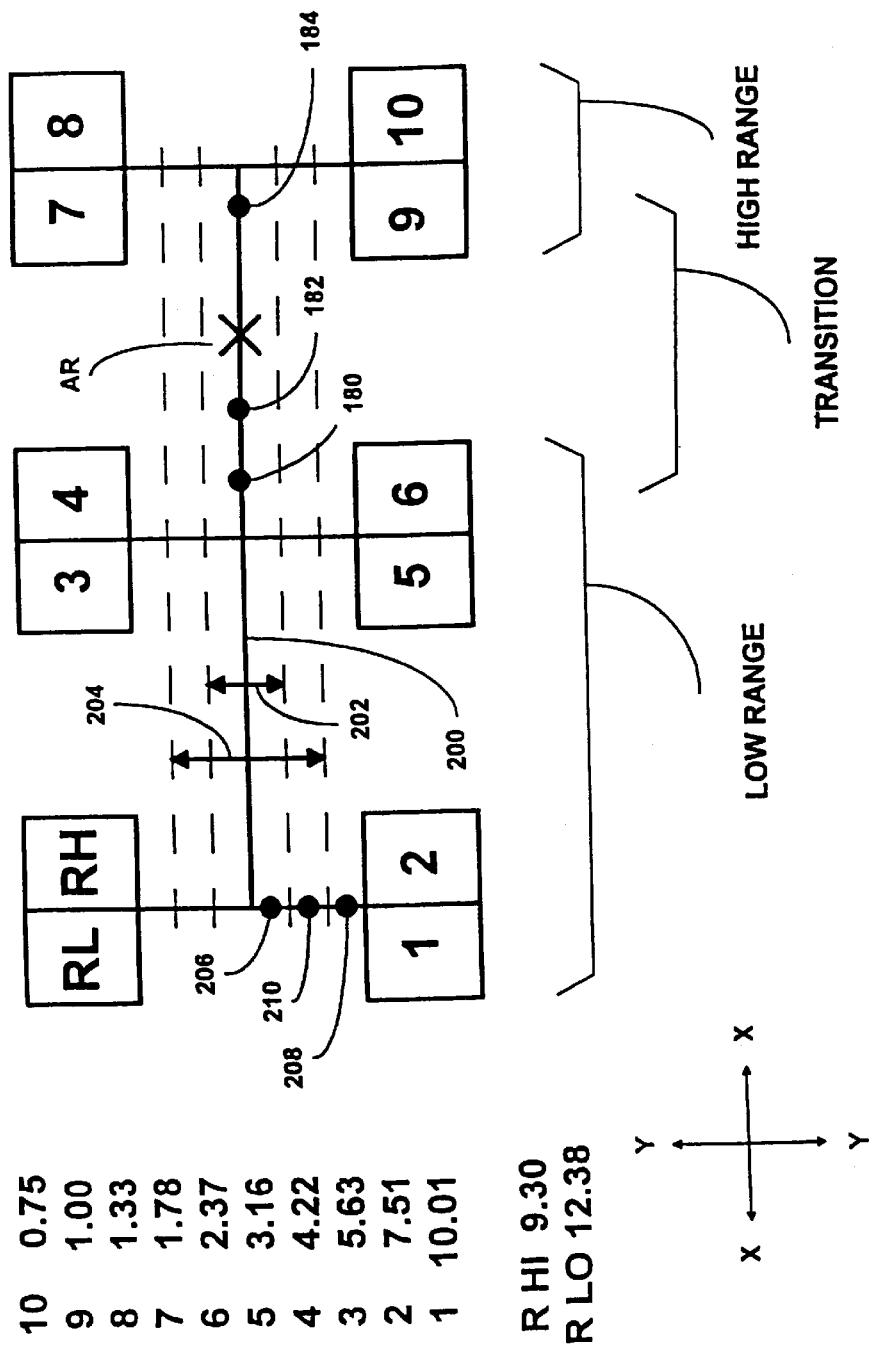
FIG. 2 is a chart illustrating the shift pattern and representative numerical ratios for the transmission of FIG. 1.
Figure 3:
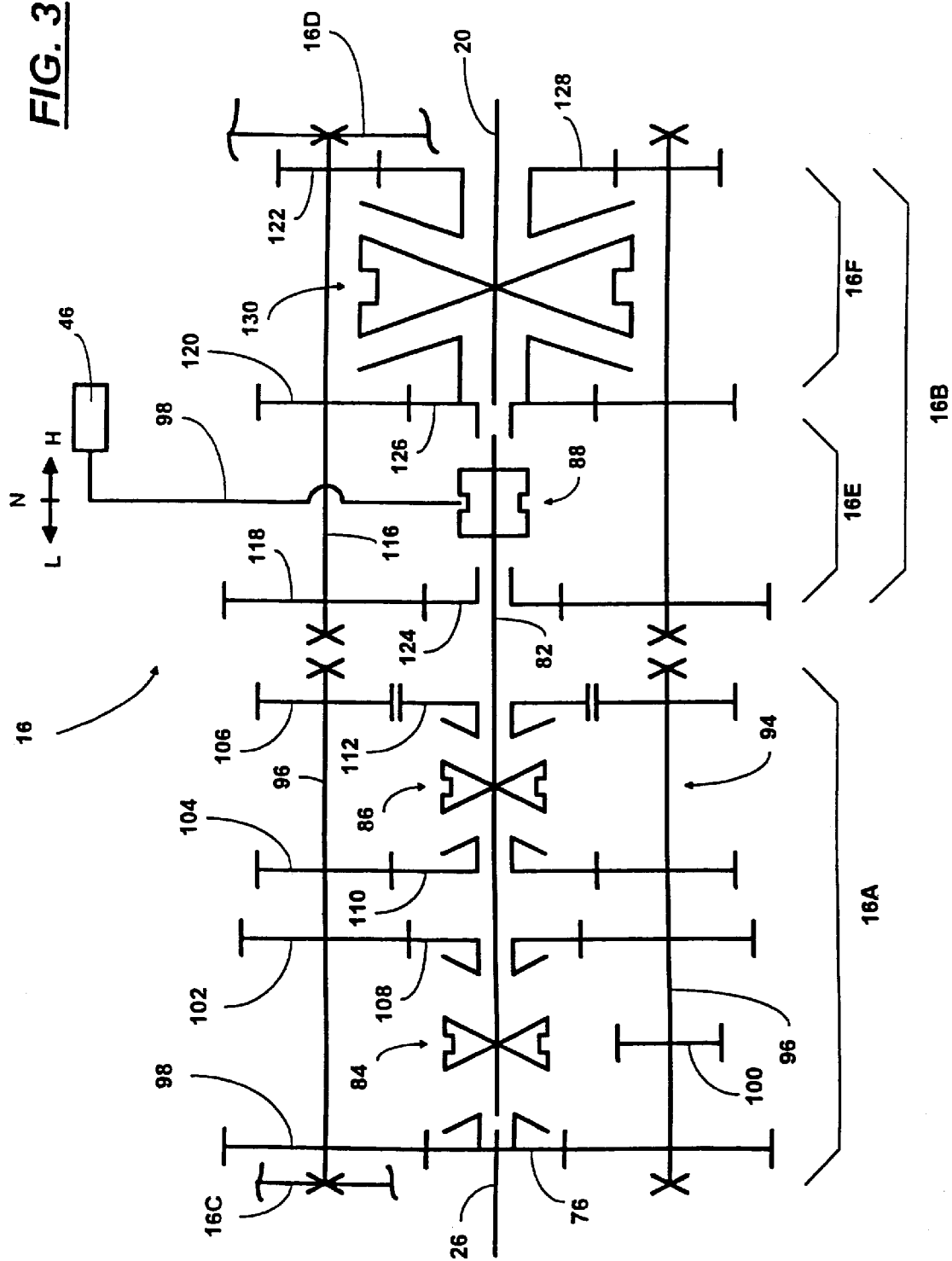
FIG. 3 is a schematic illustration of the structure of the compound mechanical transmission of FIG. 1.
Figure 4:
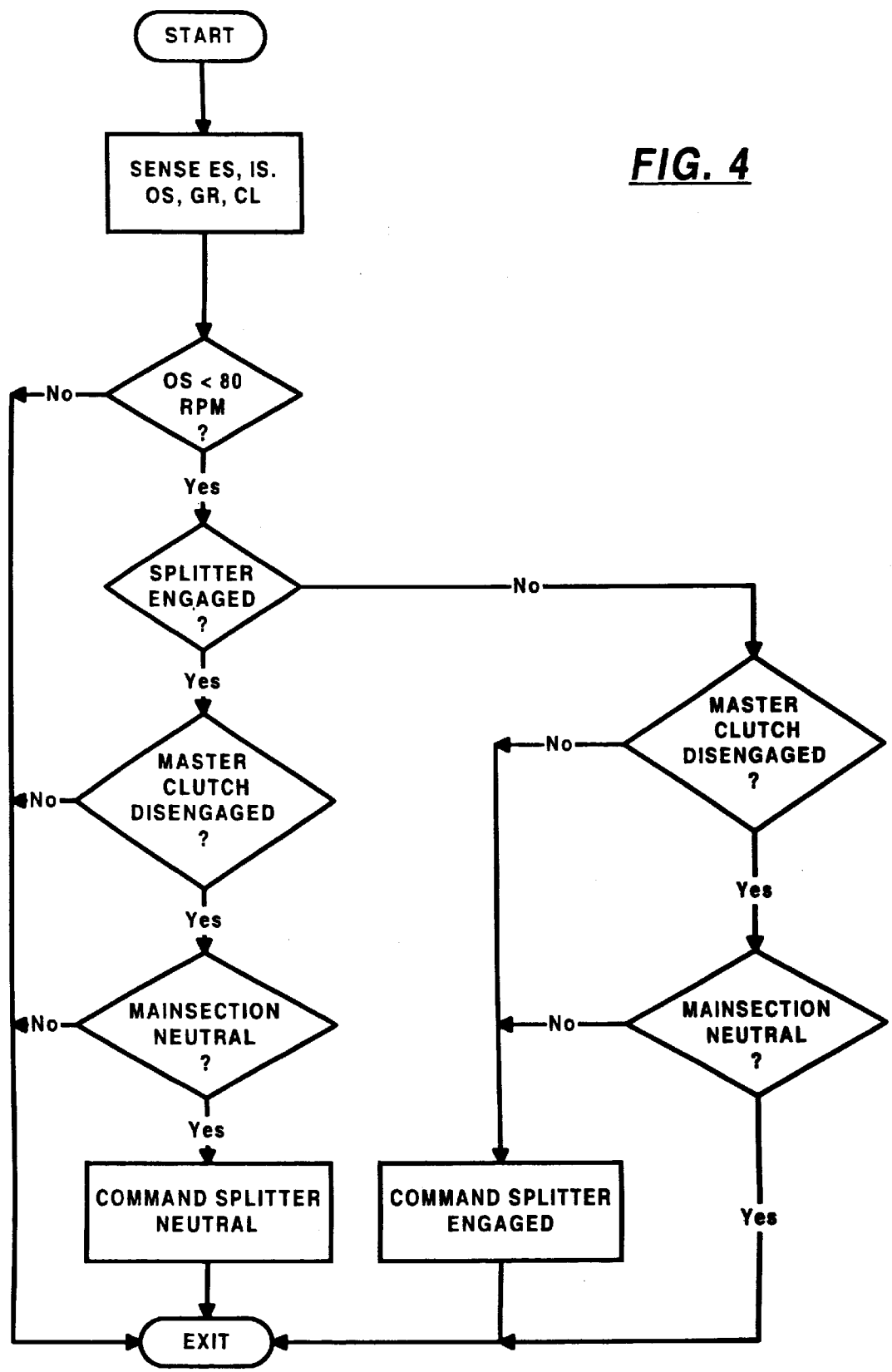
FIG. 4 is a schematic illustration, in flow chart format, of the control of the present invention.

A computer-assisted (i.e., microprocessor-based, controller-assisted) vehicular compound mechanical transmission system 10, particularly well suited to utilize the shift control of the present invention, may be seen by reference to FIGS. 1–3. The operation of the system is illustrated in flow chart format in FIG. 4.

System 10 is of the type commonly utilized in heavy-duty vehicles, such as the conventional tractors of tractor/semi-trailer vehicles, and includes an engine, typically a diesel engine 12, a master friction clutch 14 contained within a clutch housing, a multiple-speed compound transmission 16, and a drive axle assembly (not shown). The transmission 16 includes an output shaft 20 drivingly coupled to a vehicle drive shaft 22 by a universal joint 24 for driving the drive axle assembly. The transmission 16 is housed within a transmission housing to which is directly mounted the shift tower of the shift lever assembly 30. The present system is equally applicable to remotely mounted shift levers, as are used in cab-over-engine types of vehicles.

FIG. 2 illustrates a shift pattern for assisted manual shifting of a combined range-and-splitter-type compound transmission shifted by a manually operated shift lever. Briefly, the shift lever 31 is movable in the side-to-side or X—X direction to select a particular ratio or ratios to be engaged and is movable in the fore and aft or Y—Y direction to selectively engage and disengage the various ratios. The shift pattern may include an automatic range shifting feature and automatically selected and/or implemented splitter shifting, as is known in the prior art. With automatic range and splitter shifting, the transmission will be manually shifted in a manner similar to that of a 5-speed transmission. Manual transmissions utilizing shift mechanisms and shift patterns of this type are well known in the prior art and may be appreciated in greater detail by reference to aforementioned U.S. Pat. Nos. 5,000,060 and 5,390,561.

Typically, the shift lever assembly 30 will include a shift finger or the like (not shown) extending downwardly into a shifting mechanism 32, such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272,931.

In the automatic range shifting feature, as the shift lever moves in the transition area between the middle leg (¾–⅝) and the righthand leg (⅞–⁹⁄₁₀) of the shift pattern, it will cross a point, AR, which will actuate a mechanical or electrical range switch, or will be sensed by a position sensor, to cause automatic implementation of a range shift.

Shifting of transmission 16, comprising synchronized main section 16A coupled in series to auxiliary section 16B, is semi-automatically implemented/assisted by the vehicular transmission system 10, illustrated in FIGS. 1–3. Main section 16A includes an input shaft 26, which is operatively coupled to the drive or crank shaft 28 of the vehicle engine 12 by master clutch 14, and output shaft 20 of auxiliary section 16B is operatively coupled, commonly by means of a drive shaft 22 and universal joint 24, to the drive wheels of the vehicle. The auxiliary section 16B is a splitter type, preferably a combined range-and-splitter type, as illustrated in U.S. Pat. Nos. 4,754,665 and 5,390,561.

The change-gear ratios available from main transmission section 16A are manually selectable by manually positioning the shift lever 31 according to the shift pattern prescribed to engage the particular desired change-gear ratio of main section 16A.

The system may include sensors 29 (for sensing engine rotational speed (ES)), 33 (for sensing input shaft rotational speed (IS)), and 34 (for sensing output shaft rotational speed (OS)), and providing signals indicative thereof. As is known, output shaft rotational speed (OS) is an indication of vehicle ground speed. For a typical heavy-duty truck, OS=80 RPM is about 2.5 to 3 MPH road speed, depending upon axle ratio and tire diameter. As is also well known, with the clutch 14 (i.e., no slip) engaged and the transmission engaged in a known gear ratio, ES=IS=OS*GR (see U.S. Pat. No. 4,361,060). Accordingly, if clutch 14 is engaged, engine speed and input shaft speed may be considered as equal. Input shaft speed sensor 33 may be eliminated and engine speed (ES), as sensed by a sensor or over a data link (DL), substituted therefor.

Engine 12 is electronically controlled, including an electronic controller 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 38 may be provided or throttle position (THL) may be sensed from the data link. Gross engine torque (T$_{EG}$) and base engine friction torque (T$_{BEF}$) also are available on the data link.

A manual clutch pedal 40 controls the master clutch 14, and a sensor 42 provides a signal (CL) indicative of clutch-engaged or -disengaged condition. The condition of the clutch also may be determined by comparing engine speed to input shaft speed if both signals are available. An auxiliary section actuator 44 including a range shift actuator and a splitter actuator 46 is provided for operating the range clutch and the splitter section clutch in accordance with command output signals from ECU 48. The shift lever 31 has a knob 50 which contains selector switch 52 by which a driver's intent to initiate a compound shift may be sensed. The switch 52 may simply indicate an intent to shift or also the intended direction of the shift. See aforementioned U.S. Pat. No. 5,582,558.

System 10 may include a driver's display unit 54 including a graphic representation of the six-position shift pattern with individually lightable display elements 56, 58, 60, 62, 64 and 66, representing each of the selectable engagement positions. Preferably, each half of the shift pattern display elements (i.e., 58A and 58B) will be individually lightable, allowing the display to inform the driver of the lever and splitter position for the engaged ratio.

The system includes a control unit or ECU 48, preferably a microprocessor-based control unit of the type illustrated in U.S. Pat. Nos. 4,595,986; 4,361,065 and 5,335,566, the disclosures of which are incorporated herein by reference, for receiving input signals 68 and processing same according to predetermined logic rules to issue command output signals 70 to system actuators, such as the splitter section actuator 46, the engine controller 36, the range shift actuator and/or the display unit 54. A separate system controller may be utilized, or the engine controller ECU 36 communicating over an electronic data link may be utilized.

As shown in aforementioned U.S. Pat. Nos. 5,651,292 and 5,661,998, the splitter actuator 46 is a three-position device, allowing a selectable and maintainable splitter section neutral. Alternatively, a "pseudo" splitter-neutral may be provided by deenergizing the splitter actuator when the splitter clutch is in an intermediate, non-engaged position.

The structure of the 10-forward-speed combined range-and-splitter-type synchronized transmission 16 is schematically illustrated in FIG. 3. Transmissions of this general type are disclosed in aforementioned U.S. Pat. Nos. 5,000,060; 5,370,013 and 5,390,561.

Transmission 16 includes a synchronized main section 16A and an auxiliary section 16B, both contained within a housing including a forward end wall 16C, which may be defined by the clutch housing, and a rearward end wall 16D, but (in this particular embodiment) not an intermediate wall.

Input shaft 26 carries input gear 76 fixed for rotation therewith. The mainshaft 82 carries synchronized mainshaft clutches 84 and 86, and the mainshaft splitter clutch 88. Shift forks (not shown) are provided for shifting clutches 84 and 86 and are controlled by shift lever 31 acting on the shift assembly 30, which preferably will include a shift shaft position sensor. Mainshaft 82 is independently rotatable relative to input shaft 26 and output shaft 20 and preferably is free for limited radial movement relative thereto.

The main section 16A includes two substantially identical main section countershaft assemblies 94, each comprising a main section countershaft 96 carrying countershaft gears 98, 100, 102, 104 and 106 fixed thereto. Gear pairs 98, 102, 104 and 106 are constantly meshed with input gear 76, mainshaft gears 108 and 110 and an idler gear (not shown), which is meshed with reverse mainshaft gear 112, respectively. Countershaft gear 100 is provided for driving a PTO or the like.

The auxiliary section 16B of transmission 16 includes a splitter section 16E and a range section 16F. Auxiliary section 16B includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive to a driver selection switch such as a button or the like on the shift knob, as is known in the prior art and/or to control signals from ECU 48 (see U.S. Pat. No. 5,661,998). Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either piston actuator may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1)×(2×2)" type transmission providing nine or ten selectable forward speeds, depending upon the desirability and practicality of splitting the low gear ratio.

Splitter shifting of transmission 16 is preferably automated (see U.S. Pat. No. 5,435,212). Range shift devices of this general type are known in the prior art and may be seen by reference to aforementioned U.S. Pat. Nos. 3,429,202; 4,455,883; 4,561,325 and 4,663,725.

The shift knob 50 includes a sensor or an intent-to-shift button 52 by which the driver will indicate that he intends to initiate a lever shift sequence. In dynamic conditions, upon receiving the intent-to-shift signal, the controller will issue commands to the engine controller to relieve torque lock by fuel manipulations and to the auxiliary section actuator to preselect a shift into splitter neutral. This will allow easy shifting from the engaged ratio into neutral without operator throttle manipulation or clutch disengagement. Engine manipulations to relieve torque lock without requiring clutch disengagement is described in greater detail in aforementioned U.S. Pat. Nos. 4,850,236 and 5,105,357.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

According to the illustrated embodiment of the present invention, and as more fully described in aforementioned U.S. Pat. No. 5,651,292, the interengaging clutch teeth provided on splitter clutch 88 and on splitter gear 124 and splitter/range gear 126 are preferably of a relatively large backlash (i.e., about 0.020–0.060 inches for a 3.6-inch pitch diameter clutch), which will assure that almost any attempted splitter shift under full force will be completed.

The clutch 88 is moved by a shift fork 98 attached to a piston rod of the piston actuator assembly 46. Actuator assembly 46 may be a conventional three-position actuator (see U.S. Pat. No. 5,054,591, the disclosure of which is incorporated herein by reference) or an actuator of the type illustrated in U.S. Pat. Nos. 5,682,790 or 5,661,998 (the disclosures of which are incorporated herein by reference), wherein pulse width modulation of a selectively pressurized and exhausted chamber may be used to achieve the three splitter positions (L, N, H) of the shift fork.

Preferably, the splitter clutch actuator 46 will be capable of applying a variable force, such as by pulse width modulation, of supply pressure. A force lesser than full force may be utilized when disengaging and/or when synchronous conditions cannot be verified.

The position of the shift lever 31 or of the shifting mechanism 30 controlled thereby may be sensed by a position sensor device. Various positioning sensing assemblies are known in the prior art, with a preferred type illustrated in U.S. Pat. No. 5,743,143, assigned to the assignee of this application, the disclosure of which is incorporated herein by reference.

The sensor will provide a signal GR indicative of the position of shift lever 31 relative to the shift pattern illustrated in FIG. 2. Preferably, the rate of change of position (dGR/dt) also may be determined and utilized to enhance shifting of the system 10.

By way of example, referring to FIG. 2, if shift lever position can be sensed, the need for a fixed switch or the like at point AR to sense a required initiation of a shift between low range and high range is eliminated. Further, as physical switches are no longer required, the shift pattern position at which a range shift will be commanded can be varied, such as to points 180, 182 or 184, to enhance system performance under various operating conditions.

The state of engagement (i.e., engaged or neutral) of the main transmission section 16A is an important control parameter for system 10. By way of example, according to the shift logic of the present invention, under dynamic conditions, if main section neutral is sensed, the splitter clutch 88 is preferably commanded to its neutral position. Also, if the main section is engaged while the splitter is in neutral, the system will initiate automatic fuel control and not cause splitter engagement until substantial synchronous is sensed. Of course, it is important to prevent or minimize false determinations of main section neutral and/or engaged conditions.

Referring to FIG. 2, a first narrow band 202 and a second wider band 204 of vertical displacements from the bight portion 200 are utilized to determine if the main section is or is not in neutral. If the transmission main section is not confirmed as being in main section neutral, the neutral confirmation band will be the narrower band 202. This will assure that the main section 16A is truly in neutral before declaring a main section neutral condition. If the transmission main section 16A is confirmed as being in neutral, the neutral confirmation band will be the wider band 204. This assures that mere overshooting of neutral or raking of main section jaw clutches will not be incorrectly interpreted as a main section engaged condition.

Sensing the shift lever at point 206 will always be interpreted as main section neutral, and sensing the shift lever at point 208 will always be interpreted as main section engaged. However, if the shift lever is sensed at point 210, this will not cause a previous determination of a neutral or engaged condition to change.

Vehicle operating conditions other than or in addition to currently engaged or neutral condition of the main section 16A may be used to vary the width of the neutral sensing bands.

In the illustrated transmission system 10, the system controller 48 can determine the identity of the target gear ratio (GRT) from the shift shaft position sensor and the position of the splitter. The controller then determines if the main section or the splitter is engaged (assuming not a range shift) and what engine speed is needed to complete engagement of the target ratio (GRT) by engaging the splitter under current vehicle speed (as represented by output shaft speed OS). Upon completion of the shift, a throttle recovery technique (see U.S. Pat. No. 4,493,228) will be used to return control of fueling to the driver/operator.

According to the shift control of the present invention, whenever the vehicle is at or almost at rest (i.e., OS<80 RPM), the master clutch is disengaged and main section neutral is sensed, the controller 48 will automatically cause the splitter section 16E to be shifted to splitter neutral. Due to the advantageous structure of transmission 16, including the use of splitter section 16E located behind (at the output end) the main section, and in front of the range section 16F, the main shaft 82 will be disconnected from all gearing and countershafts and will carry only its own inertia and that of the clutches 84, 86 and 88. With only this relatively low inertia to synchronize to the selected main section gear (76, 108, 110 or 112), only a relatively low torque must be generated by the friction surfaces of the main section synchronizers 84 and 86. This allows the main section to be engaged in a start ratio with only very little force exerted by the operator on the shift lever 31, eliminates the need for shift-assist mechanisms, and allows the use of small, simple and inexpensive synchronizers 84 and 86.

If the master clutch is misadjusted, even with the master clutch disengaged, clutch drag will apply a sustained torque to the gears being clutched to the main shaft. If the splitter was not disengaged, the synchronizers would be grounded by the load and subject to this torque.

At very low vehicle speed (i.e., when the vehicle is stopped or almost stopped), disengagement of the master clutch while the main section is in neutral is an indication/verification that the vehicle driver intends to engage a start ratio. By way of example, sensing that output shaft speed is less than a reference, about 80 or less RPM, is an indication utilized in heavy-duty vehicles to sense a stopped or essentially stopped condition.

At such stopped or essentially stopped conditions, the transmission is automatically shifted to neutral (i.e., splitter shifted to splitter neutral) only if the driver disengages the master clutch while the main transmission section 16A is also disengaged (i.e., in main section neutral). This assures that, at very low vehicle speed, a positive act by the vehicle operator is required to cause an automatic shift to neutral, even if the main section position sensors provide an erroneous neutral signal.

With the main 16A and splitter 16E sections both in neutral, the main shaft 82 is disconnected from the input shaft 26 and associated gearing (gears 76, 98, 102, 104, 106, 108, 110 and 112) and also from the output shaft 20 and its associated gearing (gears 118, 120, 122, 124, 126 and 128).

If the splitter did not disconnect the main shaft 82 from the vehicle load, the synchronizers would be required to overcome the inertia of the countershafts, the gearing, the input shaft and certain master clutch components. This inertia would be around 0.21 pound-feet/second$^2$, while with the present invention, the synchronizers 84 and 86 must only work to overcome the inertia of the main shaft, main shaft washers and portions of the synchronizers carried by the main shaft, about 0.007 pound-feet/second$^2$. This is a reduction of 20:1 to 30:1 in the amount of work required by the synchronizers.

Upon sensing engagement of the main section in a selected start ratio or engagement of the master clutch, the controller 48 will then cause the splitter section 16E to be engaged in the appropriate splitter ratio. The appropriate splitter ratio may be determined by signals from switch 52 which may provide up/down and/or splitter-high/splitter-low shift signals or may be a default splitter ratio (preferably splitter low).

Accordingly, it may be seen that a new and improved shift control for an assisted, synchronized, compound splitter-type mechanical transmission which will reduce the force necessary to synchronize transmission main section shifts into a start ratio is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A compound vehicular transmission system (10) comprising:
- a compound mechanical transmission (16) having an input shaft coupled to an engine (12) by a manually operated master friction clutch (14) and an output shaft, said transmission having a shift-lever-shifted, synchronized main transmission section (16A) connected in series with an auxiliary splitter section, said auxiliary splitter section (16B) interposed between said main transmission section (16A) and said output shaft (20);
- a splitter actuator (46) for selectively causing said auxiliary splitter section to be shifted into a selected one of a first splitter ratio (low), a second splitter ratio (high), or a splitter-neutral (N) position, and
- a controller (48, 36) for receiving input signals (68) including signals indicative of the rotational speed of said output shaft (OS) and processing same according to logic rules to issue command output signals (70) to system actuators including said splitter actuator, said logic rules including rules for determining an engaged or neutral position of said main transmission section and of said master friction clutch section, and effective,
  - (a) upon determining that (i) said signal indicative of rotational speed of the output shaft is less than a reference value (OS<REF), (ii) the master clutch is disengaged, and (iii) the main transmission section is in a neutral condition, for causing said auxiliary splitter section to assume the neutral position; and
  - (b) then, upon determining at least one of (i) that the main transmission section is in an engaged condition and (ii) that said master clutch is engaged, for causing said auxiliary splitter section to be engaged in one of said first or second splitter ratios.

2. The system of claim 1 further comprising an auxiliary range section (16F), said auxiliary splitter section (16E) interposed between said main transmission section (16A) and said auxiliary range section (16F).

3. The system of claim 1 wherein said reference value corresponds to a substantially stopped condition of a vehicle.

4. The system of claim 1 wherein said reference value corresponds to about 2–3 MPH vehicle speed.

5. A method for controlling shifting in a compound vehicular transmission system (10) comprising a compound mechanical transmission (16) having an input shaft coupled by a manually operated master friction clutch to a fuel-controlled engine (12) and an output shaft, said transmission having a shift-lever-shifted, synchronized main transmission section (16A) connected in series with an auxiliary splitter section, said auxiliary splitter section (16B) interposed between said main transmission section (16A) and said output shaft (20), a splitter actuator (46) for selectively causing said auxiliary splitter section to be shifted into a selected one of a first splitter ratio (low), a second splitter ratio (high), or a splitter-neutral (N) position, a controller (48, 36) for receiving input signals (68) and processing same according to logic rules to determine the speed of the vehicle, the engaged or neutral condition of the main transmission section, and the engaged or disengaged condition of the master friction clutch, said method comprising the steps of:
- (a) upon determining that (i) said signal indicative of rotational speed of the output shaft is less than a reference value (OS<REF), (ii) the master clutch is disengaged, and (iii) the main transmission section is in a neutral condition, causing said auxiliary splitter section to assume the neutral position; and
- (b) then, upon determining at least one of (i) that the main transmission section is in an engaged condition and (ii) that said master clutch is engaged, causing said auxiliary splitter section to be engaged in one of said first or second splitter ratios.

* * * * *